May 12, 1964
PIERRE JEAN-MARIE THÉODORE ALLARD
3,132,600
MULTIPLE USE FREIGHT VEHICLE
Filed May 8, 1961
3 Sheets-Sheet 1
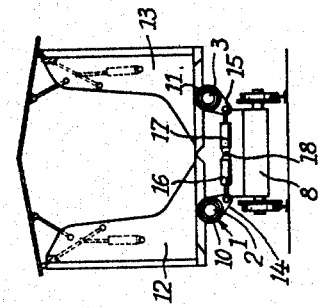
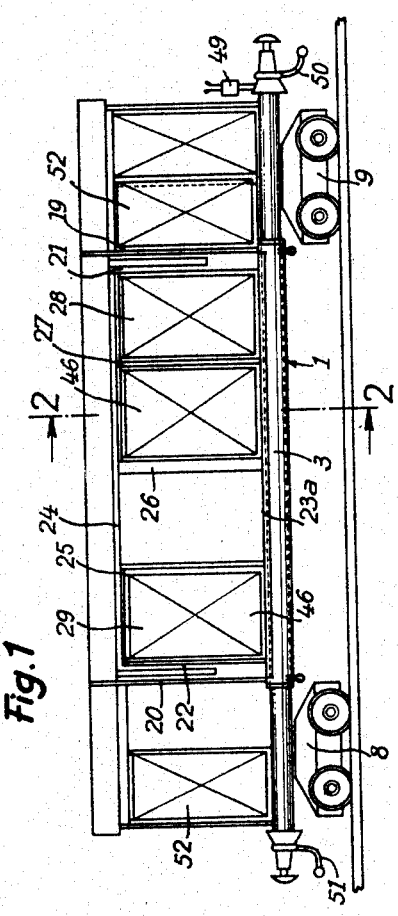
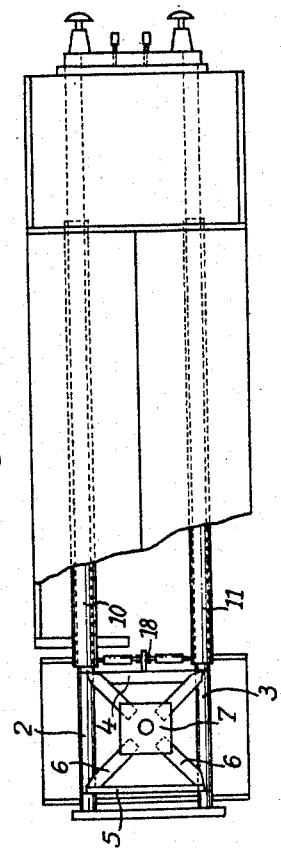
INVENTOR:
PIERRE JEAN-MARIE THÉODORE ALLARD
By Squire & Olcott
Attys.

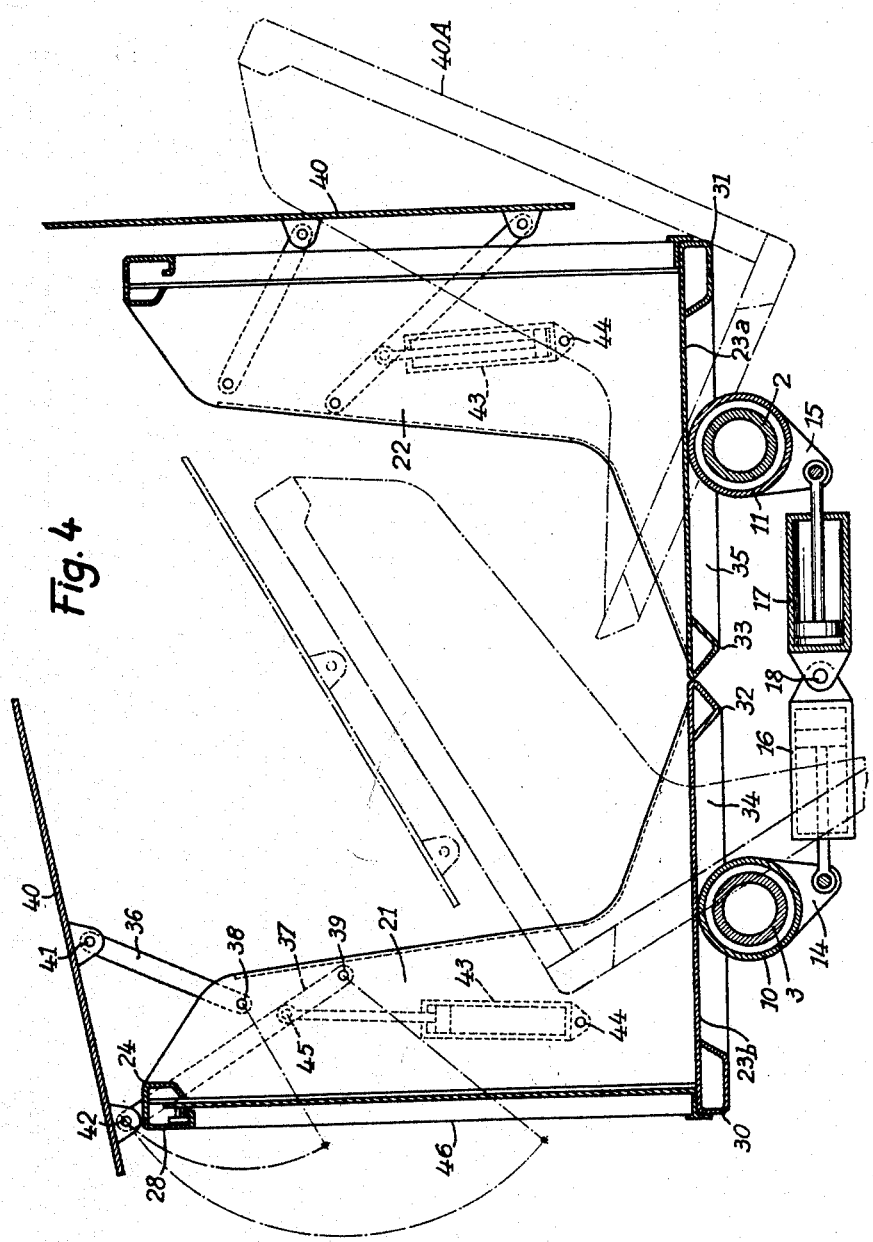

May 12, 1964
PIERRE JEAN-MARIE THÉODORE ALLARD
3,132,600
MULTIPLE USE FREIGHT VEHICLE
Filed May 8, 1961
3 Sheets—Sheet 3
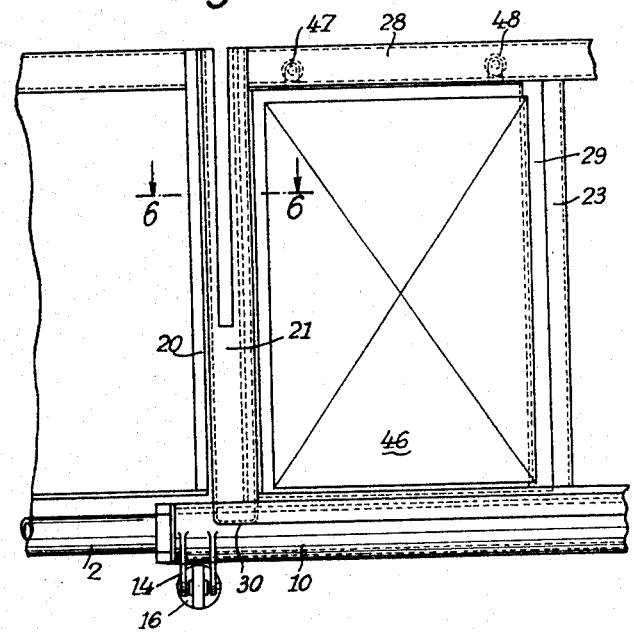
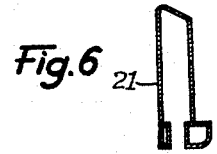
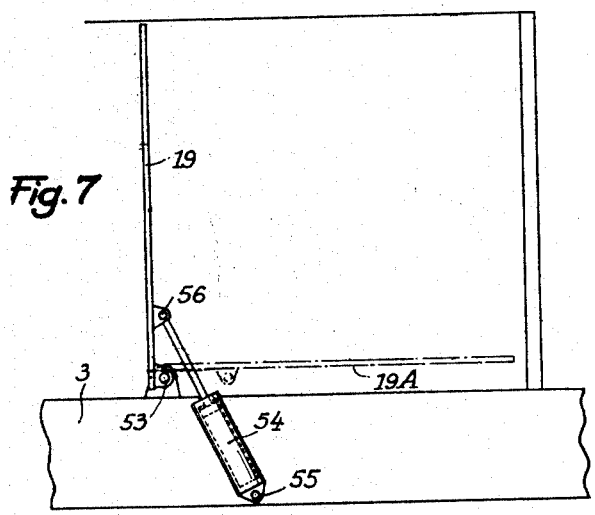
INVENTOR:
PIERRE JEAN-MARIE THÉODORE ALLARD
BY
ATTY'S United States Patent Office 3,132,600
Patented May 12, 1964

3,132,600
MULTIPLE USE FREIGHT VEHICLE
Pierre Jean-Marie Théodore Allard, 3 Rue de Constantine, Paris, France
Filed May 8, 1961, Ser. No. 108,348
Claims priority, application France May 20, 1960
7 Claims. (Cl. 105—262)

The present invention relates to a wagon or railroad freight car of universal type, namely a wagon having multiple uses. In particular, this vehicle can be used either for transporting bulk loads of material loaded by belts, a chute, grab or any other means, or for transporting separate objects such as cases, drums, packages or wrapped materials.

The principle of the wagon or freight car resides in the fact that bulk products, such as ore, coal or chemical products, are generally transported in special wagons in the form of a hopper having an outlet spout or chute permitting emptying these materials between the tracks, or in the immediate vicinity of the latter through the opening of trap doors disposed in the lower part of the hopper. Owing to their shape, these wagons are distinctly specialised and can only be used for the transport of these materials. Further, these wagons are always very high for a relatively small pay load volume.

The invention provides a wagon of multiple uses characterized in that its central part comprises two elements constituting a hopper whose emptying is regulatable, whereas the free parts located outside said hopper and in the region of the bogies are constituted by two flat-bottom wagon elements which can be provided with slidable doors permitting transporting separate objects or any other merchandise.

Said hopper is preferably of the type described in the U.S. Patent No. 3,019,949 of February 6, 1962, and comprising two elements in the form of buckets pivotable about parallel horizontal axes.

Further features of the invention are:

The two buckets are so constituted that when they are in the closed position, that is, when the lower edges of the two buckets are in contact, a movable roof can be automatically placed in position to protect the charge;

The vertical walls of the buckets constituting the two large sides of the latter are formed of slidable elements forming doors which permit access to the interior of the wagon when the latter is used for transporting merchandise;

The two buckets forming a hopper are mounted on two tubular shafts which also constitute the two main longitudinal members of the chassis of the wagon.

Further features and advantages of the invention will be apparent from the ensuing description with reference to the accompanying drawings to which the invention is in no way limited.

In the drawings:
FIG. 1 is an elevational view of a wagon according to the invention;
FIG. 2 is a cross-sectional view taken along line 2—2 of FIG. 1;
FIG. 3 is a plan view of the wagon, the roof having been partially broken away;
FIG. 4 is a cross-sectional view similar to FIG. 2 on an enlarged scale;
FIG. 5 is an elevational view of a part of one end of the wagon;
FIG. 6 is a sectional view taken along line 6—6 of FIG. 5 of a detail of the wagon, and,
FIG. 7 is a diagrammatic view of a modification of the fixing means for a panel of the wagon.

In the illustrated embodiment, the wagon comprises a chassis 1 constituted by two tubular elements 2 and 3 interconnected by rigid cross-members 4 and 5 and assembled by braces 6 to a plate 7, on which are journalled the spindles of the trucks or bogies 8 and 9.

Journalled on the tubular elements 2 and 3 are tubes or sleeves 10 and 11 which are rigidly connected to the bottoms of buckets 12 and 13 which constitute an unloading or discharging hopper.

The sleeves 10 and 11 carry ears 14 and 15 to which are fixed the ends of rams 16 and 17 which are secured by a pin 18 to the cross-member 4 (FIG. 3).

The central part of the wagon in which the hopper is enclosed is defined by vertical panels 19 and 20. These panels are preferably rigidly fixed to the chassis.

The hopper, which is of the type described in U.S. Patent No. 3,019,949, comprises vertical lateral walls formed by rigid webs 21, 22 (FIG. 4) and lower panels or bottoms 23ᵃ and 23ᵇ which contribute to the rigidity of the assembly.

The various elements constituting each bucket are connected by a frame 24. Ribs 25, 26, 27, constituted by folded metal sheets connect the assembly of the lower panel 23ᵃ or 23ᵇ of each bucket to the frame 24. Fixed panels 28, 29 partially close the sides of the hopper.

Reference will now be made to FIG. 4 which is a cross-sectional view on an enlarged scale of the details of this assembly. The elements or devices shown diagrammatically in FIG. 2 are also to be found in FIG. 4.

As can be seen, the bottoms 23 of the two hopper elements are heavily ribbed, for example by means of folded metal sheets as shown at 30, 31 and 32, 33 connected to the sleeves 10, 11 by ribs also composed of folded metal sheets 34, 35.

The end walls or lateral walls 21, 22 of each hopper bucket have the special shape shown in the drawings and are constituted by elements of folded sheet metal forming a rigid rib as shown in FIG. 6. These sheets permit housing, between their side walls, links 36, 37 which are pivoted at 38 and 39 and support a roof element 40 to which the links 36, 37 are pivoted by pins 41, 42.

Disposed within the element formed of the folded metal sheet 21 (or 22) is a ram 43 pivoted at 44 to this element and pivoted at 45 to the link 37, which permits, by its extension or its retraction, bringing the roof 40 either to the protecting position as shown on the left half of FIG. 4 or to the folded-back position at the side of the wagon as shown on the right side of FIG. 4.

FIG. 4 also shows the shape of the cross-section of the folded longitudinal members 24 constituting the frame interconnecting the elements 21 and 22 forming the ends of the hopper buckets, and the shape of the sheet metal elements 28 which act as a runway for the movable panels 46 (FIGS. 4 and 5) provided with rollers 47, 48 which roll inside these folded sheet metal elements 28.

The assembly of the hydraulic devices is connected to a control unit 49 which permits controlling the different actuations of the rams.

This unit is fed by pipes 50 and 51 which permit transmitting the fluid from a special wagon comprising an auxiliary power unit or from a hydraulic unit placed on the traction means or from a unit permanently in position in the region where the wagons must be emptied.

The connection elements terminating the pipes 50 and 51 are of known type with a valve which closes automatically as soon as the connection element is released. The hydraulic circuit on the wagon therefore remains under pressure even when it is released or detached from the power unit. In any case, mechanical locking devices are provided for blocking the two bucket elements 12 and 13 relative to each other so as to prevent them from opening during transport under the effect of vibrations. The movable panels 46 are also locked so as to remain in position.

The outer parts of the wagon are provided with movable panels 52 mounted in the same way as the panels 46.

FIG. 1 shows the left panel 46 in its open position and the right panel 46 in its closed position locked to the upright 26. The extreme right panel 52 is closed and locked to the panel 19 and in the left part of FIG. 1 the panel 52 is in its open position.

The wagon operates in the following general manner:

If it concerns the transport of bulk or heaped material, the two bucket elements 12 and 13 are locked in the closed position as shown in full line in FIG. 4.

When filling, the two movable roofs 40 are opened and positioned on the side of the wagon as shown on the right side of FIG. 4.

The wagon can be filled with merchandise in bulk. The ram 43 is actuated to bring the roof 40 to the protecting position as shown on the left side of FIG. 4, the load of this wagon being thus protected.

When the content of the wagon has to be emptied into a pit, the roofs 40 are brought to the position shown on the right side of FIG. 4 and the two buckets 12 and 13 are unlocked; the rams 16 and 17 can be brought into action and each bucket emptied as shown in dot-dash line in FIG. 4, that is, there is firstly a decompression of the material due to the swinging of one of the buckets, the bucket 13 for example, by means of the ram 17 as shown on the right side of FIG. 4. The materials in the bucket 12 are emptied and the operation is repeated for the other bucket.

According to the modification shown in FIG. 7, the panel 19, instead of being rigidly fixed to the tubular chassis is connected to this chassis by pivotal connections 53. A ram 54 connected at 55 to the tubular chassis and at 56 to the panel 19, permits swinging the latter down to the bottom of the tubular chassis, the panel assuming the horizontal position 19A shown in dot-dash line and acting as a base or bottom wall at the end of the wagon. In this case, the two fixed ends of the wagon have no entry door 52, access being had from the inner part of the wagon through the movable door 46.

The invention is not limited to the embodiments described and shown, which have been given merely by way of example.

Thus, a wagon could be arranged comprising either of the characteristics described hereinbefore, but only the central part of the described wagon being used.

Having now described my invention what I claim as new and desire to secure by Letters Patent is:

1. In a wagon comprising a chassis, said chassis comprising two parallel horizontal horizontally spaced longitudinal members, and two bogies supporting said chassis at the ends thereof; in the longitudinal space between the bogies, a hopper comprising a pair of confronting buckets, each of said buckets having a bottom, lateral walls and an outer longitudinal wall, and being open at the side which faces the other bucket and each bucket communicating with the other through said open side; means for mounting each of said buckets on each of said longitudinal members, respectively, for individual pivotal movement about said longitudinal members in either direction; and separate displacement means connected to each bucket member for effecting said individual pivotal movement thereof.

2. A wagon according to claim 1 wherein the said two longitudinal members of the chassis comprise two tubular shafts positioned under the bottoms of said buckets, and said means for mounting said buckets on said tubular shafts comprise sleeves rigidly connected to said buckets and rotatably mounted on said tubular shafts.

3. A wagon according to claim 1, wherein said separate displacement means are hydraulic cylinder means.

4. A wagon according to claim 1 wherein each of the buckets further comprises a roof portion mobile between a closing position in which said roof portion is positioned above the bucket when the latter is in the closed position, and an open position in which said roof portion is swung alongside the outer lateral wall of the wagon.

5. A wagon according to claim 4 wherein each of said roof portions is pivoted to the bucket by two pairs of links, said displacement means controlling the movements of this roof portion being pivoted to the bucket and to one of the links of the pair of links corresponding to this displacement means.

6. A wagon according to claim 1 wherein each of said buckets comprises outer vertical walls comprising slidable elements forming doors which permit access to the inside of the wagon.

7. In a wagon comprising a chassis, said chassis comprising two parallel horizontally spaced longitudinal members, and two bogies supporting said chassis at the ends thereof; in the longitudinal space between the bogies a hopper comprising a pair of confronting buckets, each of said buckets having a bottom, lateral walls and an outer longitudinal wall, each bucket being open at the side which faces the other and communicating with the other through said open side; means mounting each of said buckets on each of said longitudinal members, respectively, for individual pivotal movement about said longitudinal members in either direction; said bottoms being substantially flat, horizontal, and normally coplanar, lateral portions of said lateral walls being cut away to permit individual pivotal movement of either bucket in either direction independently of the other, said bottoms having rectilinear edges which are normally effectively in contact with each other and equidistant from said longitudinal members; a pair of spaced parallel side plates extending perpendicularly to said longitudinal members and laterally enclosing said cut away portions; and separate displacement means connected to each bucket for effecting said individual pivotal movement thereof.

References Cited in the file of this patent

UNITED STATES PATENTS

| | | |
|---|---|---|
| 268,299 | Shoudy et al. | Nov. 28, 1882 |
| 704,578 | Ray et al. | July 15, 1902 |
| 755,268 | Akers | Mar. 22, 1904 |
| 855,128 | Peltzer | May 28, 1907 |
| 908,635 | Wortman | Jan. 5, 1909 |
| 998,432 | Walker | July 18, 1911 |
| 1,062,353 | Minetty | May 20, 1913 |